Aug. 18, 1964 G. F. LUBBEN ETAL 3,144,907
HELICOPTER ROTOR AND METHOD OF MAKING A BLADE MEMBER THEREOF
Filed Nov. 4, 1959 6 Sheets-Sheet 1
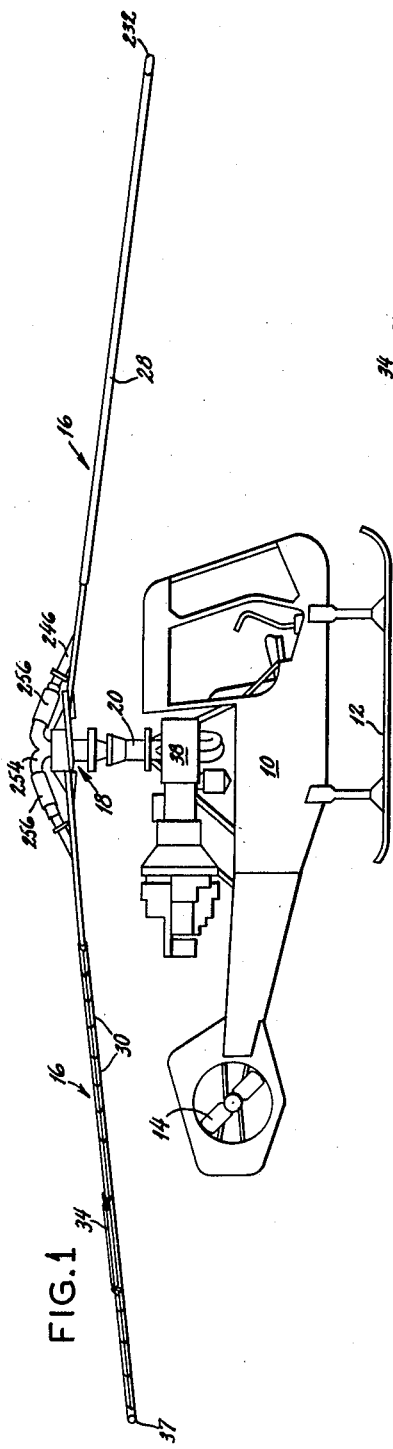
INVENTORS
GEORGE F. LUBBEN
JOHN J. SCHAUBLE
GEORGE A. McCOUBREY
BY Teller &
Mc Cormick
ATTORNEYS

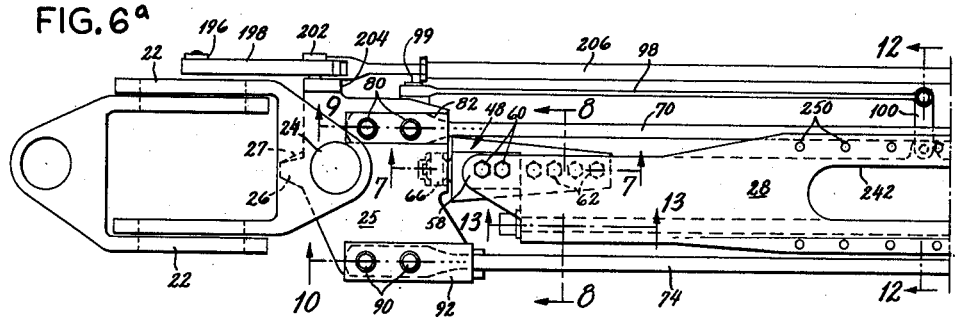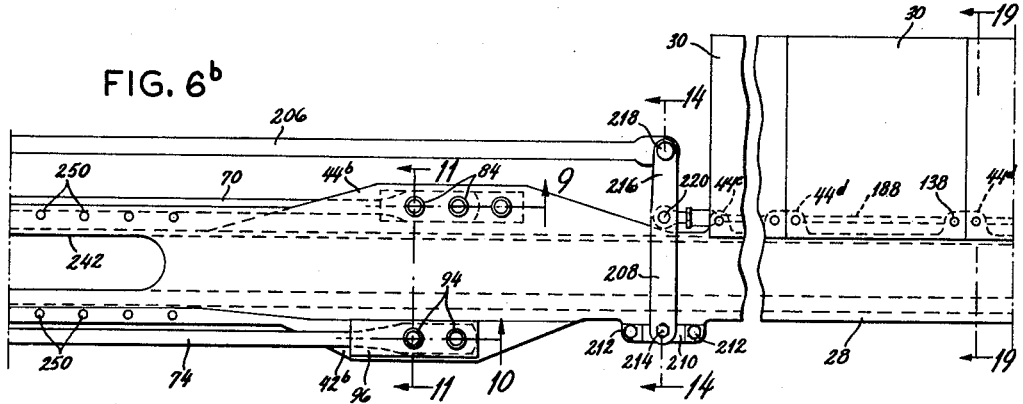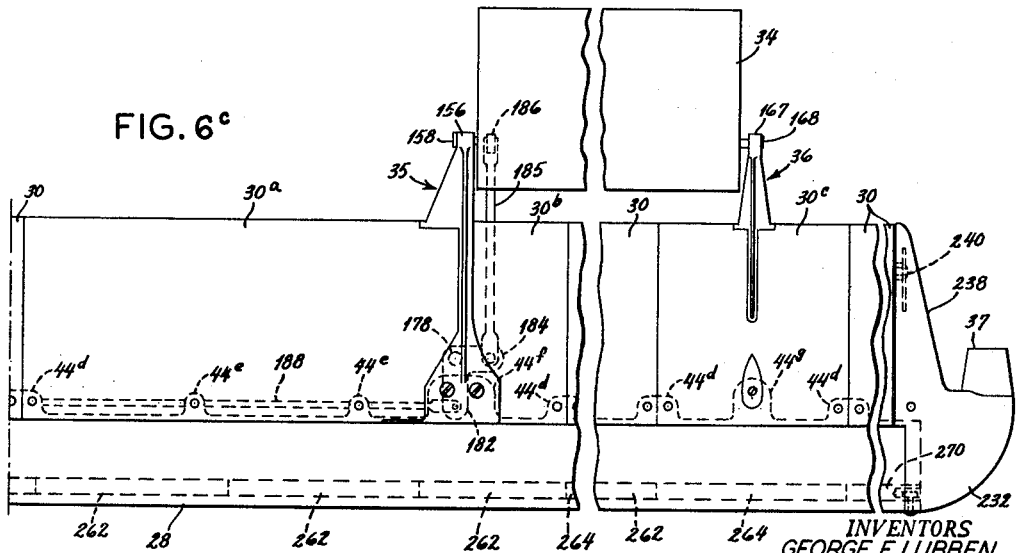

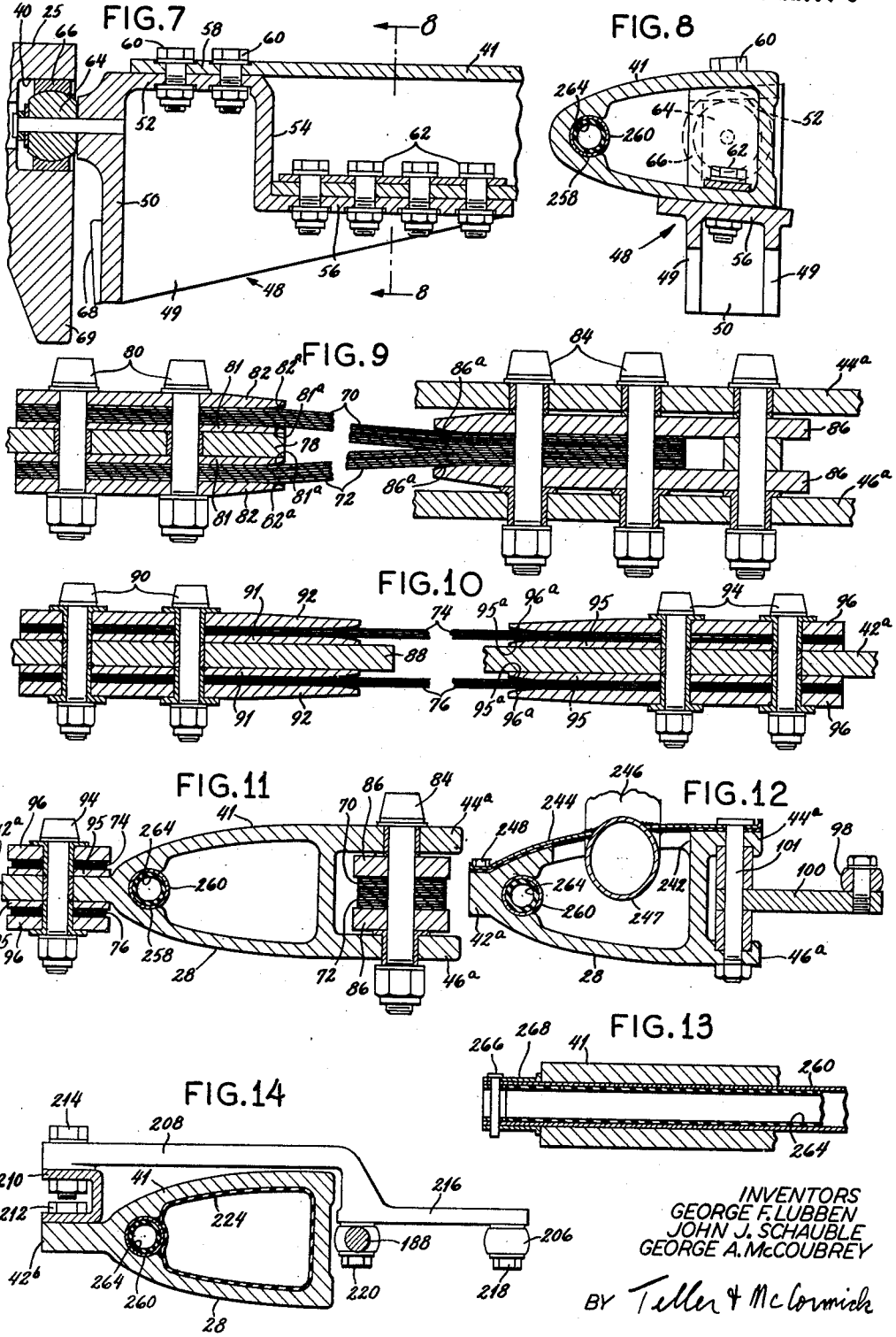

Aug. 18, 1964    G. F. LUBBEN ETAL    3,144,907
HELICOPTER ROTOR AND METHOD OF MAKING A BLADE MEMBER THEREOF
Filed Nov. 4, 1959    6 Sheets-Sheet 4

INVENTORS
GEORGE F. LUBBEN
JOHN J. SCHAUBLE
GEORGE A. McCOUBREY

BY Teller & McCormick

ATTORNEYS

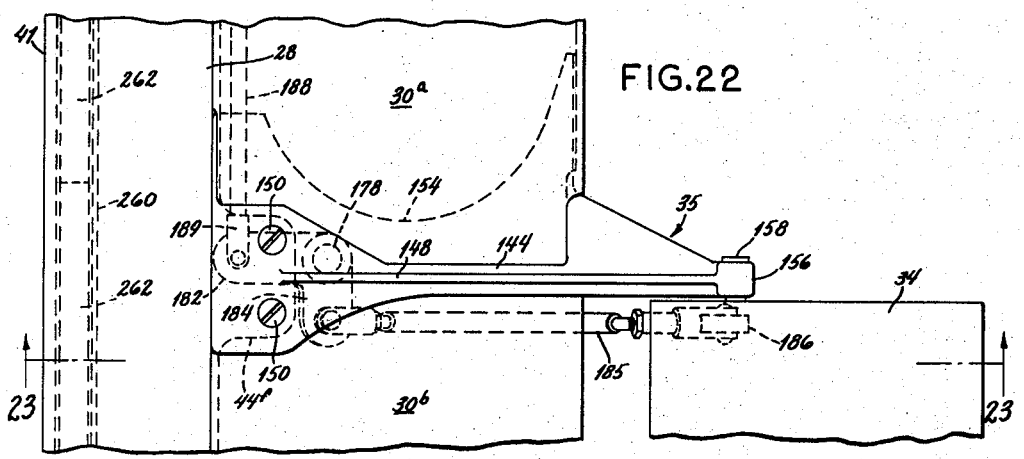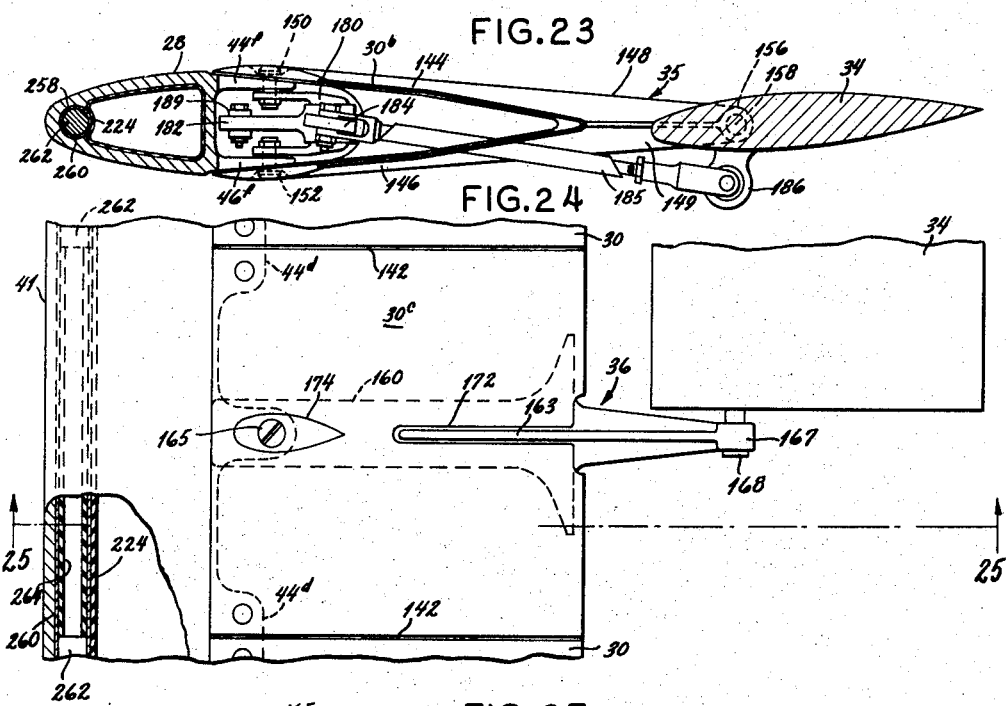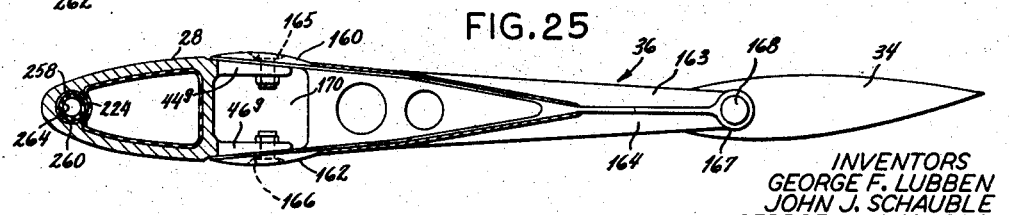

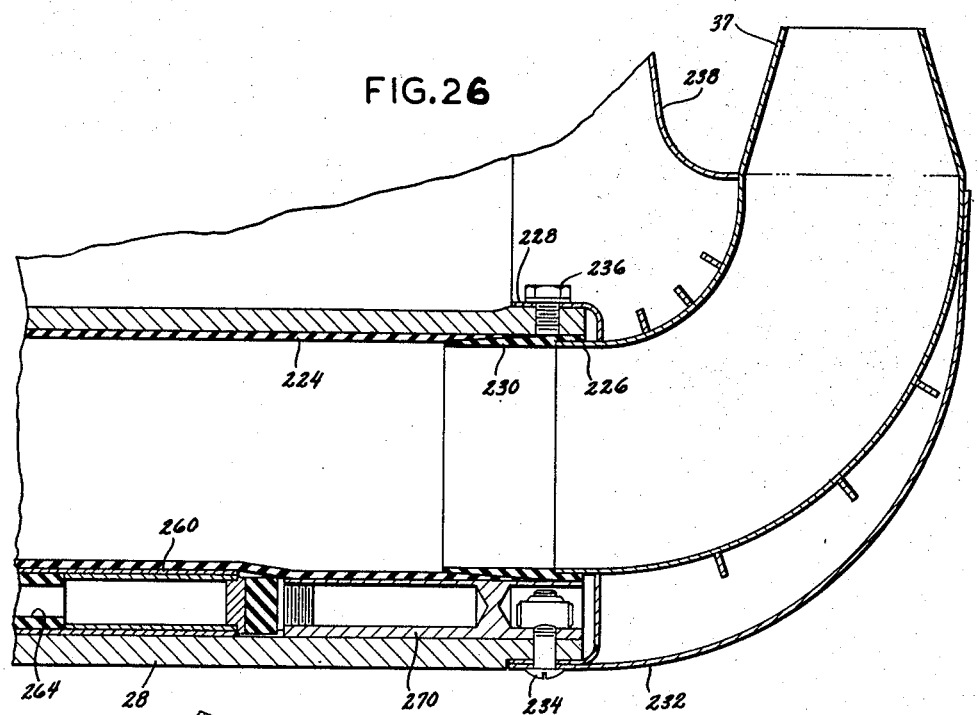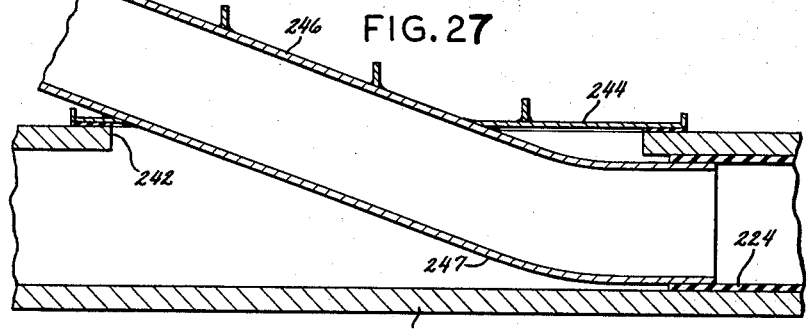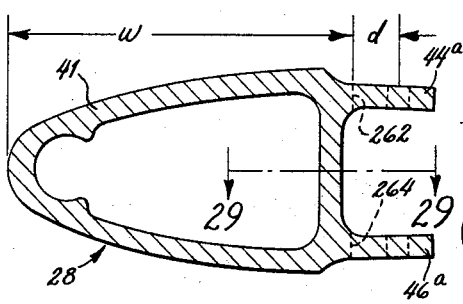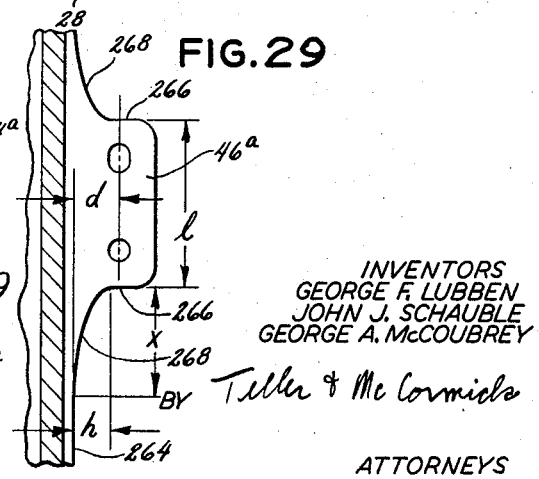

United States Patent Office 3,144,907
Patented Aug. 18, 1964

3,144,907
HELICOPTER ROTOR AND METHOD OF MAKING
A BLADE MEMBER THEREOF
George F. Lubben, Simsbury, and John J. Schauble, Windsor Locks, Conn., and George A. McCoubrey, Agawam, Mass., assignors to Kaman Aircraft Corporation, a corporation of Connecticut
Filed Nov. 4, 1959, Ser. No. 850,953
5 Claims. (Cl. 170—160.25)

This invention relates to a rotor for a helicopter. As to some of its aspects, the invention relates more particularly to a blade of the type generally disclosed and claimed in the Kaman Patent No. 2,455,866, dated January 7, 1948, but as to other aspects the invention is not so limited.

One object of the invention is to provide a torsionally resilient means interposed directly between the root portion of each rotor blade and the main body thereof which means has various structural and functional advantages.

Another object of the invention is to provide, in conjunction with a number of tension-torsion members for connecting the root end of each blade with the main body thereof so as to resiliently resist, while nevertheless permitting, limited rotative movement of such main body about its radial axis relative to the root portion or hub, a supplementary means for facilitating "tuning" of the torsional resistance between the main body and root of each blade.

Other objects of the invention will be apparent from the drawings and from the following description.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a side view of a helicopter having a rotor embodying the invention.

FIG. 2 is a plan view of one blade.

FIG. 3 is an enlarged plan view of the rotor hub and of the grip members of the two rotor blades, all other portions of the blades being omitted.

FIG. 4 is a side view of the hub and grip members as shown in FIG. 3.

FIG. 5 is a right end view of the right grip member as shown in FIGS. 3 and 4.

FIG. 6ª is a fragmentary plan view of the rotor hub and of the inner portion of one blade. The air duct and associated parts are omitted for clarity of illustration.

FIG. 6ᵇ is a fragmentary plan view of the central portion of the blade.

FIG. 6ᶜ is a fragmentary plan view of the outer portion of the blade.

FIG. 7 is an enlarged fragmentary sectional view taken along the line 7—7 of FIG. 6ª.

FIG. 8 is a transverse sectional view taken along the lines 8—8 of FIGS. 6ª and 7.

FIG. 9 is an enlarged fragmentary sectional view taken along the line 9—9 of FIGS. 6ª and 6ᵇ.

FIG. 10 is an enlarged fragmentary sectional view taken along the line 10—10 of FIGS. 6ª and 6ᵇ.

FIG. 11 is an enlarged transverse sectional view taken along the line 11—11 of FIG. 6ᵇ.

FIG. 12 is an enlarged transverse sectional view taken along the line 12—12 of FIG. 6ª, this view also showing the air duct connecting member.

FIG. 13 is an enlarged fragmentary sectional view taken along the line 13—13 of FIG. 6ª.

FIG. 14 is an enlarged transverse sectional view taken along the line 14—14 of FIG. 6ᵇ.

FIG. 15 is an enlarged plan view of one separable blade panel.

FIG. 16 is a right side view of the panel shown in FIG. 15.

FIG. 17 is a sectional view taken along the line 17—17 of FIG. 15.

FIG. 18 is an enlarged fragmentary sectional view taken along the line 18—18 of FIG. 15.

FIG. 19 is an enlarged vertical sectional view taken along the lines 19—19 of FIGS. 6ᵇ and 15.

FIG. 20 is a fragmentary plan view of the spar at the position for the connection of two panels therewith.

FIG. 21 is a fragmentary plan view similar to FIG. 20, but showing fragments of two panels in place.

FIG. 22 is an enlarged plan view of the inboard bracket for the blade flap together with portions of the immediately adjacent blade panels.

FIG. 23 is a transverse sectional view taken along the line 23—23 of FIG. 22.

FIG. 24 is a view similar to FIG. 22, but showing the outboard bracket together with portions of the immediately adjacent panels.

FIG. 25 is a transverse sectional view taken along the line 25—25 of FIG. 24.

FIG. 26 is a fragmentary sectional view of the spar taken along the line 26—26 of FIG. 20.

FIG. 27 is a combined plan and sectional view taken along the line 27—27 of FIG. 26.

FIG. 28 is an enlarged horizontal sectional view through the center of the jet nozzle and of the parts immediately associated therewith.

FIG. 29 is an enlarged vertical sectional view taken along the line 29—29 of FIG. 2.

*General Organization*

The rotor blades and the controls therefor embodying the invention are shown as being of the type generally disclosed and claimed in the before-mentioned Kaman Patent No. 2,455,866. It will be understood however that the present invention, in certain of its aspects, is not limited to rotor blades embodying the inventions set forth in said patent and said application.

Referring to the drawings, and more particularly FIG. 1 thereof, 10 represents the fuselage of a helicopter having a rotor embodying the invention, 12 represents the landing gear, and 14 represents the tail rotor. These parts can be widely varied and they do not of themselves constitute any part of the invention.

The rotor of the helicopter comprises a plurality of generally radial blades 16, 16 connected with a hub 18 and uniformly spaced about a central vertical axis. The hub 18 is connected with a vertical shaft 20 extending upwardly from the fuselage 10. As shown, the rotor has two blades, but the invention is not necessarily so limited. When there are only two rotor blades, the hub comprises two similar members 22, 22, and the blades 16, 16 are respectively connected with said hub members. One blade 16 is shown in its entirety on a small scale in FIG. 2, and various details of said blade are shown on larger scales in other figures.

Referring particularly to FIG. 2, each blade of the rotor is preferably connected with the corresponding hub member 22 for movement about an approximately vertical lead-lag axis provided by a pin 24. The blade includes an inner grip member 25 which carries all other blade parts. When the blade is movable about a lead-lag axis, it is the grip member which engages the pin 24. The entire vertical blade, including the grip member, is therefore movable about the lead-lag axis. For limiting movement in the leading direction, the grip member 25 is provided with an inwardly extending finger 26 which engages a shoulder 27 on the hub member 22.

The grip member 25 constitutes the inner or root portion of the blade, and the pin 24 constitutes means for holding the grip member to prevent any movement thereof about an axis extending longitudinally of the blade. The blade has a radial spar 28 which is connected with the grip member and which carries various airfoil elements. The airfoil elements carried by the spar 28 are preferably detachable panels some of which are indicated at 30, 30. The several airfoil elements, including those at 30, 30, are sometimes hereinafter referred to collectively as constituting the airfoil lifting portion of the blade.

Interposed between the grip member or root portion 25 of the blade and the main body thereof are torsion members, hereinafter described in detail and generally indicated at 32, that are capable of substantially twisting about the longitudinal radially extending blade axis and with respect to said root portion. Stated more specifically, the torsion members are interposed between the grip member 25 and the spar 28. The said torsion members, considered collectively, have torsional resiliency tending to return the main body of the blade to normal position after twisting.

Means is provided for applying force to the blade body to effect twisting at the torsion members 32. This means serves to adjust the pitch of the lifting portion of the blade as permited by the torsional resiliency of said tension torsion members.

Preferably the means for applying force and for thereby effecting pitch adjustment includes an aerodynamic servo-flap 34 located at the rear of the blade body adjustable about a longitudinal axis. The flap is carried by inboard and outboard brackets 35 and 36 connected to the spar 28. Special detachable panels 30$^a$, 30$^b$ and 30$^c$ are provided adjacent the flap brackets 35 and 36. The flap 34 serves by reason of aerodynamic forces acting thereon during rotation to twist the blade chiefly at the torsion members 32 thereof and to thereby change the effective pitch of the blade to varying substantial extents depending upon the varying relative angular positions of the flap. Relatively movable flap moving connections, hereinafter described in detail, extend from the flap to the hub and they are connectible with actuating mechanism on the fuselage for angularly moving said flaps relatively to their respective blades during rotor rotation.

While the invention as to some of its aspects is not so limited, the rotor is shown as being rotated by wing tip jet nozzles indicated generally at 37. A suitable air compressor 38, shown in FIG. 1, is provided on the fuselage and air under pressure is delivered from the compressor to the jet nozzles through ducts to be described.

*Hub and Spar and Connecting Bracket*

The before-mentioned hub members 22, 22 are generally U-shaped in vertical plan as shown in FIG. 3, and they are oppositely disposed and are arranged so that their legs embrace the shaft 20. The hub members are connected with the shaft 20 for movement independently of each other about horizontal trunnions 39, 39 having a common axis which extends through the center of the shaft. The trunnions 39, 39 may be integral with the shaft.

The two grip members 25, 25 are identical in construction and, when they are arranged as shown, the two lead-lag axes are in a common vertical plane extending through the axis of the shaft. As more clearly shown in FIGS. 3, 4 and 5, each grip member 25 has a radial cylindrical hole 40 extending inwardly from its outer face. The purpose of the hole 40 is hereinafter fully explained.

The spar 28 for each blade is preferably a metallic extrusion, and as shown it has the initial shape shown in FIG. 11, said spar comprising a hollow body 41 which is exteriorly shaped to constitute the leading edge of the blade, a flange 42 extending forwardly from the body or in the leading direction, and two vertically spaced flanges 44 and 46 extending rearwardly from the body or in the trailing direction. The shape of the leading portion of the spar is that of the leading portion of an airfoil. The hollow body 41 constitutes a duct for supplying air to the corresponding jet nozzle 37 as hereinafter explained in detail.

At most positions along the length of the spar, the major portions of the flanges 42, 44 and 46 have been cut away or machined, but the flanges are retained where they are needed to constitute lugs for the connection of various parts. Thus the required lugs are integral with the spar, but the weight is greatly reduced by the cutting away of the unneeded portions of the initially provided full length flanges. Between the lugs the spar has the shape shown in FIG. 8. All of the hereinafter described lugs for the attachment of various parts to the spar have been formed as above described. This will be understood without detailed explanation for each lug.

It is a characteristic of extruded metal that its microscopic crystalline structure is homogeneous and has its crystals elongated and extending longitudinally. In a spar embodying the invention, the crystalline structure is homogeneous throughout the main body of the spar and throughout the projecting lugs thereof, said crystalline structure throughout its entirety having its crystals elongated and extending longitudinally.

As shown to some extent in FIG. 6a and more fully in FIGS. 7 and 8, a connecting bracket 48 is provided at the inner end of each spar 28. The bracket is rigidly connected with the spar, and said bracket and said spar together with the airfoil elements are sometimes hereinafter referred to collectively as constituting the body of the blade.

The bracket 48 has transversely spaced side walls 49, 49 which are connected by an inner vertical wall 50, an upper horizontal wall 52, an outer vertical wall 54 and a lower horizontal wall 56. The lower horizontal wall 56 is connected with the outer vertical wall 54 and is spaced outwardly from the upper horizontal wall 52. The lower wall of the spar body 41 has been cut away so as to leave the upper wall thereof with an inwardly projecting portion 58. The projecting portion 58 of the upper spar wall is connected by bolts 60, 60 to the upper bracket wall 52 and the lower spar wall is connected by bolts 62, 62 to the lower bracket wall 56.

Interengaging elements are provided on the grip member 25 and on the body of the blade, preferably on the bracket 48, which elements are constructed and arranged to permit limited rotative movement of the body about a generally radial axis and which elements are also constructed and arranged to permit limited radially outward movement of the body while preventing bodily movement of the inner end of the body in any nonradial direction. When the interengaging elements permit radially outward movement of the blade body, the before-mentioned torsion elements serve also as tension elements to limit said outward movement.

Preferably, said interengaging elements are further constructed and arranged to permit limited swinging or angular movements of the blade body relatively to said grip member. As shown, the interengaging elements comprise the inner surface of said cylindrical hole 40 in the grip member 25 and also comprise a partly spherical member 64 rigidly connected with the bracket 48 and located within said hole. The member 64 is guided within said hole so that its center is maintained at the axis of the hole. As shown, the spherical member 64 is rigidly secured to the inner wall 50 of the bracket 48. Preferably, the spherical member 64 fits within a ring 66, and the exterior of the ring fits the interior of the hole 40. The ring 66 may be made in two parts to facilitate assembly.

The before-mentioned torsion elements serve to prevent outward movement of the blade body relatively to the grip member 26, but said body is universally adjustable about the center of the spherical member 64 and it can swing in any direction.

Relative downward swinging movement of the blade body relatively to the grip member 25 is limited by means of a droop stop 68 on the bracket wall 50, this stop being engageable with an adjacent downward extension 69 on the grip member. The droop stop 68 prevents downward swinging movement of the blade body only when the rotor is idle. FIG. 1 shows the blades in their lower idle positions. During rotation, centrifugal force and the lift of the blades establish an equilibrium wherein the blades are at an upward coning angle.

Tension-Torsion Members

As before stated, torsion members at 32 are provided for connecting the grip member 25 with the spar 28, these members serving to resist rotative movement of the blade body while permitting such movement to a limited extend about the radial axis of the center of the spherical member 64. Preferably, the members 32, 32 of each blade also serve as tension members to prevent outward movement of the main body of the blade. These members will be hereinafter referred to as tension-torsion members.

As shown in FIGS. 6$^a$, 6$^b$, 9 and 10, there are two tension-torsion members 70 and 72 which connect the grip member 25 and the spar 28 near the trailing edge of the latter. The members 70 and 72 constitute a pair of members spaced in the trailing direction from the blade axis. There are two tension-torsion members 74 and 76 which connect the grip member 25 and the spar 28 near the leading edge of the latter. The members 74 and 76 constitute a pair of members spaced in the leading direction from the blade axis. Preferably, each of the tension-torsion members comprises a plurality of thin flexible generally horizontal metallic strips which are arranged in a layer or stack.

Preferably, the tension-torsion members of at least one pair are vertically spaced from each other throughout a portion of their length and are in engagement with each other throughout another portion of their length. As shown in FIG. 9, the members 70, 72 of the trailing pair are so arranged. This arrangement provides a truss effect and enables the members 70, 72 to resist upward or downward angular movement of the blade body. As shown in FIG. 10, the members 74, 76 of the leading pair are vertically spaced from each other throughout their entire length.

Referring particularly to FIGS. 9 and 11, it will be seen that the thin metallic strips that constitute the member 70 of the trailing pair are located at their inner ends above a flange 78 on the trailing portion of the grip member 25 and that the thin metallic strips that constitute the member 72 of said pair are located at their inner ends below the said flange 78. At their said inner ends the strips of the members 70 and 72 are connected with said flange 78 by means of bolts 80, 80 and bearing plates 81, 81 and 82, 82 at opposite sides of the strips. The strips that constitute the members 70 and 72 are in engagement and in a single layer at their outer ends and said single layer is between upper and lower lugs 44$^a$ and 46$^a$ which are portions of the initially provided flanges 44 and 46 of the spar 28. Said strips of the members 70 and 72 are connected at their outer ends with said flanges 44 and 46 by means of bolts 84, 84 and interposed bearing plates 86, 86. Thus, the members 70 and 72 are vertically spaced from each other throughout a portion of their length, and they are in engagement throughout another portion of their length.

Referring particularly to FIGS. 10 and 11, it will be seen that the thin metallic strips that constitute the member 74 are located at their inner ends above a flange 88 on the leading portion of the grip member 25 and that the thin metallic strips that constitute the member 76 are located at their inner ends below said flange 88. At their inner ends the strips of the members 74 and 76 are connected with said flange 88 by means of bolts 90, 90 and bearing plates 91, 91 and 92, 92 at opposite sides of the strips. Said layers of strips 74 and 76 at their outer ends are above and below a lug 42$^a$ which is a portion of the initially provided flange 42 of the spar 28. Said strips are connected with said lug 42$^a$ by means of bolts 94, 94 and bearing plates 95, 95 and 96, 96 at opposite sides of the strips. It will be evident that the members 74 and 76 are vertically spaced from each other throughout their entire length.

The flexible strips constituting the tension-torsion members 70, 72, 74 and 76 prevent outward movement of the blade body, the ring 66 being automatically adjusted longitudinally of the hole 38 to accommodate the exact position of the bracket 48 as determined by said tension members. The flexible strips constituting said tension-torsion members not only prevent outward movement of the blade body, but they also act as torsion elements to resist rotative movement or twisting of the blade while permitting such movement or twisting to a limited extent. Said strips have resiliency tending to restore the blade body to normal position after twisting.

Preferably, the plates 81, 81 and 82, 82 have curved surfaces 81$^a$, 82$^a$ at their outer ends and the plates 86, 86 have curved surfaces 86$^a$ at their inner ends, these curved surfaces being adjacent the opposite faces of the strips or members 70 and 72. Preferably, the plates 91, 91 and 92, 92 have curved surfaces 91$^a$ and 92$^a$ at their outer ends and the plates 95, 95 and 96, 96 have curved surfaces 95$^a$ and 96 at their inner ends, these curved surfaces being adjacent the opposite faces of the strips or members 74 and 76. These several curved surfaces enable the strips to flex smoothly and without any sharp bends such as would be caused by sharp corners at the ends of the plates.

As best shown in FIG. 5, the flanges 78 and 88 on the grip member 25 are inclined transversely and the tension-torsion strips 70, 72, 74 and 76 and also the flanges on the spar 28 are normally similarly inclined. This inclination provides the blade with the required initial or normal pitch.

The tension-torsion members serve primarily to prevent outward movement of the blade relatively to the grip member 25 and to permit controlled twisting relatively to said grip member. The truss effect of the members 72 and 74 provides some resistance to angular blade movement, but even so the tension-torsion members are not sufficiently rigid to support the entire weight of the blade. When the blade is idle, most of the weight of the blade is carried by the droop stop 68 as previously explained.

The tension-torsion members, acting either alone or in conjunction with another torsion member, to be described, offer continually increasing resistance as force is applied to turn or adjust the blade body about its radial or pitch axis and from an initial or normal position. When the blade adjusting force is applied by means of a servo-flap as shown and as preferred, the resistance of the torsion elements serves to limit the amount of turning or twisting of the blade under any given conditions of flap angle, rotative speed and the like. It will be obvious that if the torsion elements were too stiff there would be an insufficient amount of twisting, and that if the torsion elements were too soft there would be an excessive amount of twisting. Each blade must therefore be accurately "tuned" to insure an exactly predetermined amount of twisting in response to each flap position, and this can be effected by selecting tension-torsion members such as 70, 72, 74 and 76 having the proper characteristics.

Supplemental Torsion Bar

Although "tuning" can be effected by the provision of tension-torsion members having the required characteristics, it is preferred to supplement these members by a separate torsion bar, the resistance and resiliency of which can be accurately determined. As best shown in FIG. 6a, a longitudinal torsion bar 98 is provided. This bar is shown as being near the trailing edge and adjacent the torsion members 70, 72, but the exact location is not essential. The bar 98 is rigidly connected at its inner end to the grip member 25, as by a pin 98a fixed to the latter member, and at its outer end it is connected to the spar 28. As the tension-torsion members of the blade are twisted by applied force, preferably by the areodynamic action of the servo-flap 34, the bar 98 is correspondingly twisted. The bar resists twisting to an extent dependent on its size and shape and it tends to restore the blade to its normal condition after twisting.

Two means are provided which serve respectively for connecting the inner end of the torsion bar with the grip member 25 and for connecting the outer end of said bar with the spar 28. Each of these serve to prevent relative rotative movement of the bar, and preferably these means are adapted for the ready attachment and detachment of said torsion bar independently of the main portion elements. At least one of the connecting means for the torsion bar is constructed and arranged to permit relative longitudinal movement of the bar so as to prevent any tension therein.

The connecting means for the bar 98 at the inner end thereof is shown as being a bolt 99. The connecting means for the bar 98 at the outer end thereof includes a transverse link 100. The link is pivotally connected with the spar 28 and with the bar and the pivotal connections are snugly fitted to avoid lost motion. The link 100 compensates for upward and downward movements of the trailing portion of the spar as the result of twisting and it thus prevents any tension in the bar 98. Preferably and as shown, the link 100 is pivoted on a vertical pin 101 entered in holes in lugs 44a and 46a on the trailing portion of the spar 28, these lugs being best shown in FIG. 12. The lug 44a has a function additional to that of carrying the pin 101 and it is therefore long and narrow and there is a similar lug 42a on the leading portion of the spar. The additional function of these two lugs 42a and 44a will be hereinafter explained.

When a separate torsion bar such as 98 is provided, the tension-torsion members such as 70, 72, 74 and 76 have less torsional resistance than would otherwise be necessary. The provision of the bar 98 greatly facilitates "tuning." The tension-torsion members are designed to provide a little less than the required torsional resistance, the exact amount being unimportant. Then the bar 98 is provided to accurately supplement the torsional resistance of the said members, and the required supplemental resistance can be determined, if necessary, by the trial and error method. If after trial a chosen bar does not have the exact resistance that is required, it can be readily replaced by another bar.

*Separately Detachable Airfoil Panels*

The airfoil portion of the blade as shown in FIG. 2 preferably comprises separate panels detachably connected with the spar, but the invention is not necessarily so limited. As shown, there are panels arranged in the following sequence: a series of panels 30, 30; the panel 30a; the panel 30b; a second series of panels 30, 30; the panel 30c; and a third series of panels 30, 30. The several panels are sometimes hereinafter referred to collectively as constituting an airfoil lifting portion of the blade.

In accordance with one phase of the invention and as hereinafter explained in detail, the panels are so connected with the spar that any one of them can be disconnected and replaced without removing or disturbing any other panel.

One of the panels 30 is shown in detail in FIGS. 15 to 18, and it will be understood that the other panels are generally similar. The main body of the panel 30 comprises a honeycomb structure 102 between upper and lower skin walls 104 and 106. The main body further comprises side walls 108 and 110 and a leading wall 112. At the leading end of the panel, extensions on the top and bottom walls and on the leading wall project in the leading direction and provide upper and lower main connecting flanges 114 and 116, these flanges having holes 117 near their ends for receiving screws.

Preferably, a U-shaped sheet metal member 118 connected to the leading wall 112 provides secondary flanges 119 and 120 which project in the leading direction and are respectively below and above the main flanges 114 and 116. Sheet metal members 122 and 124 riveted to the flanges 119 and 120 hold captive lock nuts 126 and 128 respectively below and above said flanges and aligned with the screw holes in the flanges 114 and 116.

The spar 28 is provided with two series of companion upper and lower lugs 44d and 46d which are formed by machining as before stated. The lugs 44d and 46d are machined to have less transverse width and less thickness than the initial flanges 44 and 46.

The lugs 44d and 46d are arranged in pairs, those of one pair being shown in FIG. 19. The pairs of lugs are so spaced and positioned that the lugs of each pair are engaged by two panels 30, 30. Each of the lugs 44d and 46d of each pair has two holes respectively provided with bushings 130 and 132. A spacer 133 may be provided at the area adjacent the bushings. Upper and lower screws 138 and 140 are entered in the holes in the flanges 114 and 116 and in the holes in the bushings 130 and 132 in the lugs 44d and 46d. These screws extend through the last said holes and respectively engage the captive nuts 126 and 128 and the panels 30, 30 are thus secured to the spar. For the innermost panel 30 as shown in FIG. 6b, there are provided upper and lower lugs similar to the lugs 44d and 46d but adapted for holding only said innermost panel. The upper lug is shown at 44e and it has only one bushing which is not shown but is similar to the bushing 132.

Holes for one pair of screws 138 and 140 for each panel are elongated in the radial direction. Preferably and as shown in FIG. 20, the bushings 130 and 132 have holes 134 and 136 which are so elongated. The spar has special pairs of lugs for the panel 30a, the upper lugs being shown at 44e, 44e in FIG. 6c. The lugs 44e, 44e have bushings similar to the bushings 130 and have elongated holes such as 132.

The spar 28 and the several panels 30, 30a, 30b and 30c may have different coefficients of expansion and they may expand and contract to different extents as the result of changes in ambient temperature. Furthermore, the compressed air conducted through the hollow spar body 41 will have been heated as the result of the compression and thus the spar is heated and expanded to a greater extent than the panels. The elongated holes 134 in the bushings 130 permit the expansion of the spar independently of the panels, there being slight slippage adjacent said bushings 130.

Each panel, except the innermost panel 30 and the panel 30b, is provided at its inner side with upper and lower strips 142 of resilient soft rubber or equivalent material for engaging the next adjacent panel to provide a seal between the two panels. The strips 142 are sufficiently resilient to compensate for the slight increase in panel spacing as the result of spar expansion.

In the event of damage to a blade, any one or more of the several panels 30, 30a, 30b or 30c can be readily detached independently of any other panel and can be replaced as required by removing the corresponding screws 138 and 140. Any panel so removed can be replaced by a new panel.

*Aerodynamic Flap and Connections*

As before stated, the flap 34 is carried by brackets 35 and 36 on the spar 28. The flap and the brackets therefor are shown in FIGS. 22 to 24. The structural details of the flap and its bearings do not constitute a part of the present invention, and the flap and bearings are therefore shown only conventionally.

Referring more particularly to FIGS. 22 and 23, the bracket 35 has upper and lower arms 144 and 146 which are respectively above and below the inner portion of the panel 30$^b$ and which are reinforced by integral ribs 148 and 149. These arms are connected respectively with upper and lower lugs 44$^f$ and 46$^f$ on the spar by means of screws 150 and 152. The bracket 35 has an inward extension 154 which fits within the outer portion of the panel 30$^a$. Said panel 30$^a$ is specially shaped at its outer portion to engage and fit the bracket. At its trailing end the bracket 35 has a bearing portion 156 which receives and fits a pintle 158 on the flap 34.

Referring more particularly to FIGS. 24 and 25, the bracket 36 has upper and lower arms 160 and 162 which are reinforced by integral ribs 163 and 164. The arms 160 and 162 are connected respectively with lugs 44$^g$ and 46$^g$ on the spar by means of screws 165 and 166. At its trailing end the bracket 36 has a bearing portion 167 which receives and fits a pintle 168 on the flap 34. The pintle 168 cooperates with the pintle 158 on the bracket 35 to provide a pivotal support for the flap.

The panel 30$^c$ is generally similar to the panels 30, but it is specially formed to fit around the bracket 36. The panel is assembled with the spar from the rear and before the flap 34 is in place. The panel has an interior opening 170 which provides space for the lugs 44$^g$ and 46$^g$ and for the nuts on the screws 165 and 166. The upper and lower skin walls of the panel have openings 172 and 174 for receiving portions of the upper and lower arms 160 and 162 of the bracket.

Connections are provided for maintaining and changing the pitch angle of the flap 34. These connections include a bell crank adjacent the bracket 35 as shown in FIGS. 22 and 23. The bell crank is movable on a pivot pin 178 carried by a bracket 180. The bracket is U-shaped and is held by nuts on the screws 150 and 152. The bell crank has a generally transverse arm 182 and a generally longitudinal arm 184. A transverse link 185 connects the arm 180 of the bell crank with a depending horn 186 on the flap 34. A longitudinal link 188 having a yoke 189 is connected with the arm 182 of the bell crank and this link extends inwardly toward the hub. The link 188 is threaded into said yoke 189. It will be apparent that the link 188 maintains the flap 34 in adjusted position and that longitudinal movement of the link serves to angularly adjust the flap to change the pitch angle thereof.

The mechanism at the hub for moving the link 188 and for thus adjusting the flap 34 is best shown in FIGS. 3, 4 and 5. The mechanism for the blade at the left, as viewed in FIGS. 1, 3 and 4, is more clearly shown, but it will be understood that the mechanism is duplicated for the blade at the right which has been described in detail.

A vertically movable link 190 is provided for the left blade and a similar link is provided for the right blade. These links are connected with a swash plate and other parts, not shown, which serve in accordance with conventional practice to move the links 190 upwardly and downwardly as required for collective and differential pitch changes.

The link 190 is pivotally connected with a lever 192 which is pivotally connected at 194 with the corresponding hub member 22. The lever 192 is connected with a generally upright link 196 which is pivotally connected at 197 with the generally longitudinal arm 198 of a bell crank which also has a generally upright arm 200. The bell crank is carried by a horizontal pivot pin 202 on a bracket 204 fixedly secured to the corresponding grip member 26. One of the brackets 204 is more clearly shown in FIG. 5. A longitudinally extending link 206 is connected with the arm 200 of the bell crank and this link extends outwardly.

As best shown in FIGS. 6$^b$ and 14, a transversely extending lever 208 is carried by the spar 28 adjacent the innermost panel 30. The spar is provided with a lug 42$^b$ and a lever support 210 is connected with said lug by screws 212, 212. The lever 208 is pivotally connected at 214 with the support 210 and said lever extends rearwardly over the top of the spar. The lever has a downwardly offset portion 216 at the rear of the spar. The outer end of the link 206 is pivotally connected at 218 with the rear end of the lever portion 216. The inner end of the link 188 is pivotally connected with the lever portion 216 at 220, this connection being closely adjacent the spar.

The link 188 which connects the lever 208 with the bell crank arm 182, FIGS. 22 and 23, extends through the leading portions of the inner series of panels 30, 30 and through the leading portion of the panel 30$^a$. For guiding said link 188, each of said panels is provided near its inner side with a grommet 222 as shown in FIGS. 15, 16 and 18. This grommet is carried by a sheet metal bracket 225. When a panel is to be removed, the link 188 must be disconnected and withdrawn. The link can be disconnected by detaching the pivotal connection at 220 and by then turning the link to unscrew it from the yoke 189.

Referring again to FIG. 4, it will be seen that upward movement of the link 190 moves the bell crank 198, 200 in the counterclockwise direction and moves the link 206 in the inward direction. Referring again to FIGS. 22 and 23, it will be seen that inward movement of the link 188 moves the bell crank 180, 185 in the clockwise direction and moves the link 184 in the leading direction. Movement of the link 185 in the leading direction moves the flap 34 in the clockwise direction, that is, in the direction to decrease its negative pitch or increase its positive pitch. The described movements are reversed upon downward movement of the link 190. Changes in the pitch of the flap 34 effect twisting of the blade at 32 and thus the flap 34 controls the pitch of the main blade 16, all as fully explained in the said Kaman Patent No. 2,455,866.

Referring to FIGS. 3 and 4, it will be particularly observed that the bell crank 198, 200 is carried by the grip member 35 which is movable about the lead-lag axis at 24. As the result of lead-lag movements, the pivot connection at 197 shifts slightly and in a horizontal direction with respect to the lever 192. The upright link 196 permits this shifting with little or no effect upon the motion transmitted from the link 190 to the link 206.

*Wing Tip Jet Nozzles and Air Ducts Therefor—FIGS. 26 and 27*

As has been stated, air under pressure is delivered to the jet nozzles 37 from a compressor 38 on the fuselage. The before-described hollow body 41 of each spar 28 constitutes a major portion of the duct for conveying air to the corresponding jet nozzle. In order to protect the metal of the spar from heat and from other action of the air, a liner 224 is preferably provided within the hole in the spar body. The material of the liner may be varied, but a silicone rubber material has been found to be satisfactory. The liner 224 is a preformed tube which is inserted in the spar opening. After insertion, the ends of the tube are temporarily sealed and air under pressure is introduced into the tube to expand it and force it into contact with the entire inner surface of the hole.

Referring particularly to FIG. 28, the jet nozzle 37 is formed of sheet metal and it is provided with a portion 226 which extends within the hole in the spar. The jet nozzle is also provided with a flange 228 which fits around and engages the exterior of the spar. An adapter 230 is provided which is formed of soft resilient material and which fits between the nozzle portion 226 and the exterior of the hole in the spar. This adapter 230 extends inwardly to insure an airtight fit with the inner end of the liner 224.

There is also provided a fairing member 232 which encloses all but the tip of the nozzle 37 and which fits around and engages the leading portion of the spar. The leading portions of the nozzle flange 228 and of the fairing member 232 are held by a screw 234. The trailing portion of the nozzle flange 228 is held by a screw 236. The fairing member 232 has a trailing portion 238 which is connected with the outermost panel 30 by a screw 240.

The spar 28 is provided at the top with an elongated opening 242, as shown in FIGS. 6ᵃ, 6ᵇ and 12. Connected to the spar above the said opening 242 is a member 244 carrying a tube having an upper portion 246 and a lower portion 247, said tube being best shown in FIGS. 12 and 29. The member 244 is held in place by screws 248, 248 entering screw holes 250, 250 in the beforementioned narrow lugs 42ᵃ and 44ᵃ on the spar. The lower portion of the tube 247 is within the hole in the spar and it is of such size and shape that it engages the liner 224 to provide an airtight fit.

Air from the compressor 38 is conducted to the interior of the hollow main shaft 20 by suitable means not shown. A bifurcated duct member 254, shown in FIG. 1, has an airtight fit with the upper end of the shaft 20. Flexible tubes 256, 256 connect the bifurcations of the member 254 with the outer tubular portions 246, 246 on the members 244, 244 on the two blades. The air flows through the tubes and from the inner portions 247 thereof to the lined interiors of the spars.

From the foregoing description, it will be understood that compressed air from the compressor 38 is delivered to the hollow shaft 20. From the shaft the air flows through the bifurcated member 254, and thence for each blade through the flexible tube 256, through the tube 246, 247 and through the hollow spar body and the lining 224 therein, and finally to the jet nozzle 37. The flexible tubes 256 are of such length and flexibility that they accommodate all movements of the blade bodies relatively to the hub.

*Balancing Elements—FIGS. 8, 13 and 26*

Referring particularly to FIG. 8, it will be seen that the spar body 40 is provided near the leading edge with an interior portion 258 which communicates with the main interior but which is cylindrical through more than 180°. Fitted within the portion 258 and extending throughout most of the length of the spar is a metallic tube 260 which is best shown in FIGS. 13, 24 and 28. The beforedescribed liner 224 fits around a portion of the tube 260 as shown in FIGS. 14, 19, 23 and 25.

Located within the tube 260 are lead weights 262, 262 which are held in proper positions by tubes 264, 264 of suitable phenolic material also located within the tube 260. As shown in FIG. 13, the innermost phenolic tube 264 is held in place by a pin 266 extending through holes in a sleeve 268 attached to the inner end of the spar. As shown in FIG. 28, the outermost phenolic tube 264 is held in place by several parts including a plug 270 which fits the interior portion 258 of the spar and is held in place by the same screw 234 which holds the nozzle 37 and the fairing member 232. By selecting weights and phenolic tubes of suitable lengths, any required lengthwise distribution of weight can be obtained for proper balancing.

*Dimensional Details of Spar—FIGS. 28 and 29*

It has been stated under the subheading "Hub, Spar and Connecting Bracket," that the spar 28 is a section of extruded metal initially having throughout its lentgh a uniform cross-sectional shape including a main body 41 and also including at least one longitudinal flange, such as 44ᵃ or 44ᵇ, projecting transversely from the main body, major portions of each said projecting flange being cut away in such manner as to leave one or more relatively short longitudinal lugs, such as 44ᵈ or 46ᵈ, which are integral with the main body 41 and are adapted for use in the connection to the spar of other blade elements such as the panels 30, 30.

Without special provision, the stress in or near the spar lugs would be excessive when parts such as blade panels are attached by means of bolts or screws extending through holes in the lugs. In accordance with the present invention, the lugs are so proportioned and shaped as to avoid excessive stresses.

It is known that the stress concentration effect of simple holes in a stressed member, whether used for attachment bolts or otherwise, can produce a local increase of stresses on the order of three times those which would exist in a fatigue loaded member not having such holes. The permissible fatigue strength of such a member is thus reduced to approximately one-third, and this reduction so has been sometimes offset by an increase in member cross section to restore the local stresses to an acceptable value. This, of course, results in a corresponding increase in member weight. For aircraft use increased weight must be avoided, and in accordance with the present disclosure means is provided for permitting attachment holes without the large concentration of stresses that usually attend the provision of such holes.

The above objective is attained through the use of an integral lug structure proportioned to take into account the characteristics of stress fields which bear a close resemblance to the flow of a liquid in a conduit in accordance with the laws of hydrodynamics. This prevents the lug from providing sufficient disturbance to the "stress flow" to result in an undue stress concentration. In addition, the lug proportions allow the hole or holes to be so positioned as to be in a redistributed field of lower than nominal intensity so that the peak stresses at the hole are in general lower than the nominal or average value for the stressed member and are thus approximately one-third of that which would exist if the hole were located in the main stress field of the member.

The several lugs formed as above stated can have various sizes and shapes, but in order to minimize weight and attain other advantages it is ordinarily preferred to provide relatively short lugs such as 44ᵃ or 46ᵃ having flat or planar transverse end faces 266, 266. Such lugs are shown in detail in FIGS. 28 and 29.

In order to avoid excessive stresses within the spar and within the lugs and in accordance with the before stated principles, it is necessary to provide fillets 268, 268 between the end faces 266, 266 and the main body of the spar. It is necessary not only to provide the fillets, but also ncessary to maintain the fillet dimensions and certain lug dimensions within predetermined relative limits, in relation to each other and in relation to the width of the main body of the spar.

Throughout most of the spar, the machining between the lugs has been such that small longitudinal ribs 262, 264 are left. The lugs project from these ribs and for present purposes these ribs are regarded as being parts of the main body of the spar.

Each lug 44ᵃ or 46ᵃ has at least one hole extending therethrough (for a bushing such as 130 or 132) and two holes are shown. There is a distance $d$ between the center of the hole or holes and the main body of the spar. The distance $d$ is related to the width of the main body which width is designated $w$. The distance $d$ should be no less than $.08w$, and it may be somewhat greater.

The length $d$ of the lug is important and this length should be no greater than $3.4d$, and it may be somewhat less.

The face of each fillet 268 has approximately the shape of one-quarter of an ellipse having a transverse minor half-axis $h$ and having a longitudinal major half-axis $x$, the ellipse being tangent to the corresponding end face 266 and tangent to the face of the corresponding rib 262 or 264. The length of the minor half-axis $h$ is within the approximate range of $.5d$ to $d$. The length of the major half-axis $x$ is within the appropriate range of $2.6h$ to $3h$.

In the example illustrated in FIGS. 28 and 29, the actual full scale dimensions are:

$$w = 4.06''$$
$$d = .55''$$
$$l = 1.87''$$
$$h = .45''$$
$$x = 1.26''$$

It has been stated $d$ should be no less than $.08w$; and as shown $.08w$ is about $.324''$, the dimension $d$ being substantially greater. It has been stated that $l$ should be no greater than $3.4d$; and as shown $3.4d$ is about $1.97''$, the dimension $l$ being somewhat less. It has been stated that $h$ should be within the approximate range of $5d$ to $d$; and as shown this range would be from $.275''$ to $.55''$, the dimension $h$ being within the stated range. It has been stated that $x$ should be within the range of $2.6h$ to $3h$; and as shown this range should be from about $1.17''$ to $1.35''$, the dimension $x$ being within the stated range.

The invention claimed is:

1. The combination in a helicopter rotor of a hub rotatable about an approximately vertical axis, a grip member connected with the hub, a blade body extending radially outwardly from the grip member and having an airfoil lifting portion, a plurality of separate generally radial tension-torsion members fixedly connected at their inner ends with the grip member and fixedly connected at their outer ends with the blade body which tension-torsion members prevent radially outward movement of the blade body and have torsional resiliency for resisting rotative movement of said body about a radial axis while permitting such movement to a limited extent, a generally radial bar additional to said tension-torsion members and having torisonal resiliency for also resitsing rotative movement of the body about said radial axis, two means serving respectively to connect the inner end of the bar with the grip member to prevent relative rotative movement and to connect the outer end of the bar with the body to prevent relative rotative movement, at least one of said means being constructed to permit relative longitudinal movement of said bar so as to avoid tension therein, and means for applying force to the blade body to effect adjustment thereof about said radialu axis and relatively to the grip member and to thereby adjust the pitch of said lifting portion as permitted by the torsional resiliency of said tension-torsion members.

2. The combination in a helicopter rotor as set forth in claim 1, wherein each of said connecting means is adapted for the ready attachment and detachment of said torsion bar independently of said torsion members.

3. The combination in a helicopter rotor of a hub rotatable about an approximately vertical axis, a grip member connected with the hub, a blade body extending radially outwardly from the grip member and having an airfoil lifting portion, a plurality of separate generally radial tension-torsion members fixedly connected at their inner ends with the grip member and fixedly connected at their outer ends with the blade body which tension-torsion members prevent radially outward movement of the blade body and have torsional resiliency for resisting rotative movement of said body about a radial axis while permitting such movement to a limited extent, a generally radial bar additional to said tension-torsion members and having torsional resiliency for also resisting rotative movement of the body about said radial axis, two means serving respectively to connect the inner end of the bar with the grip member to prevent relative rotative movement and to connect the outer end of the bar with the body to prevent relative rotative movement, at least one of said means being contracted to permit relative longitudinal movement of said bar so as to avoid tension therein, a flap carried by the airfoil portion of the blade body and angularly adjustable relatively thereto, and means for angularly adjusting the flap to enable said flap during rotor rotation to aerodynamically effect adjustment of the blade body about said radial axis and relatively to the grip member and to thereby adjust the pitch of said lifting portion as permitted by the torsional resiliency of said tension-torsion members and said torsion bar.

4. The combination in a helicopter rotor, of a hub rotatable about an approximately vertical axis, a grip member connected with the hub for pivotal movement about a nonradial axis in fixed relation to the hub, a blade body extending radially outwardly from the grip member and having an airfoil lifting portion, interengaging elements respectively on said grip member and on the inner end of said body for preventing bodily movement of the inner end of the body in any nonradial direction which elements are constructed and arranged to permit said body to move relatively to the grip member either rotatively about a radial axis or radially outwardly, a plurality of separate generally radial tension-torsion members fixedly connected at their inner ends with the grip member and fixedly connected at their outer ends with the blade body which tension-torsion members prevent radially outward movement of the blade body and which tension-torsion members have torsional resiliency to resist rotative movement of said body about said radial axis while permitting such movement to a limited extent, at least one of said tension-torsion members being substantially spaced in the leading direction from said radial axis and at least one of said tension-torsion members being substantially spaced in the trailing direction from said radial axis, and means for applying force to the blade body to effect adjustment thereof about said radial axis and relatively to the grip member and to thereby adjust the pitch of said lifting portion as permitted by the torsional resiliency of said tension-torsion members, each of said tension-torsion members comprising a layer or stack of thin flexible generally horizontal metallic strips, there being four separate tension-torsion members two of which are in superposed positions and constitute a pair of members spaced in the leading direction from said radial axis and the other two of said members being in superposed positions and constituting a pair of members spaced in the trailing direction from said radial axis, the members of one of said pairs being vertically spaced from each other throughout a portion of their length and in engagement with each other throughout another portion of their length.

5. The combination in a helicopter rotor, of a hub rotatable about an approximately vertical axis, a grip member connected with the hub for pivotal movement about a nonradial axis in fixed relation to the hub, a blade body extending radially outwardly from the grip member and having an airfoil lifting portion, interengaging elements respectively on said grip member and on the inner end of said body for preventing bodily movement of the inner end of the body in any nonradial direction which elements are constructed and arranged to permit said body to move relatively to the hub member either rotatably about the radial axis or radially outwardly, four separate generally radial tension-torsion members fixedly connected at their inner ends with the grip member and fixedly connected at their outer ends with the blade body which tension-torsion members prevent radially outward movement of the blade body and which tension-torsion members have torsional resiliency to resist rotative movement of said body about said radial axis while permitting such movement to a limited extent, two of said tension-torsion members being in superposed positions and vertically spaced from each other throughout their entire length and constituting a pair of members spaced in the leading direction from said radial axis and the other two of said tension-torsion members being in superposed positions and vertically spaced from each other throughout a portion of their length and in engagement with each other throughout another portion of their length and constituting a pair of members spaced in the trailing direction from said radial axis, a servo-flap carried by the airfoil portion of the blade body and angularly adjustable relative thereto, and means for angularly adjusting said servo-flap to enable it during rotor rotation to aerodynamically effect adjustment of the blade body about said radial axis and relatively to the grip member as permitted by the torsional resiliency of said tension-torsion members.

References Cited in the file of this patent

UNITED STATES PATENTS

| | | |
|---|---|---|
| 2,429,646 | Pullin | Oct. 28, 1947 |
| 2,430,948 | Platt | Nov. 18, 1947 |
| 2,600,531 | Hafner | June 17, 1952 |
| 2,606,278 | Sikorsky | Aug. 12, 1952 |
| 2,620,884 | Gluhareff | Dec. 9, 1952 |
| 2,631,676 | Hiller | Mar. 17, 1953 |
| 2,674,327 | Pullin et al. | Apr. 6, 1954 |
| 2,754,917 | Kee | July 17, 1956 |
| 2,754,918 | Gluhareff | July 17, 1956 |
| 2,757,745 | Verhage et al. | Aug. 7, 1956 |
| 2,771,144 | Lasserre et al. | Nov. 20, 1956 |
| 2,818,123 | Hiller | Dec. 31, 1957 |
| 2,949,967 | Jevanovich | Aug. 23, 1960 |
| 2,950,768 | Wagner | Aug. 30, 1960 |
| 2,961,051 | Wilford et al. | Nov. 22, 1960 |
| 2,963,094 | Continieau | Dec. 6, 1960 |
| 2,994,384 | Stevens | Aug. 1, 1961 |

FOREIGN PATENTS

| | | |
|---|---|---|
| 909,803 | France | Jan. 9, 1946 |
| 418,698 | Great Britain | Oct. 30, 1934 |

OTHER REFERENCES

American Helicopter magazine, October 1954, pages 8 and 13.

Aircraft Engineering magazine, October 1950, vol. XXII, issue 260, pages 292, 293, 294, 295.